UNITED STATES PATENT OFFICE.

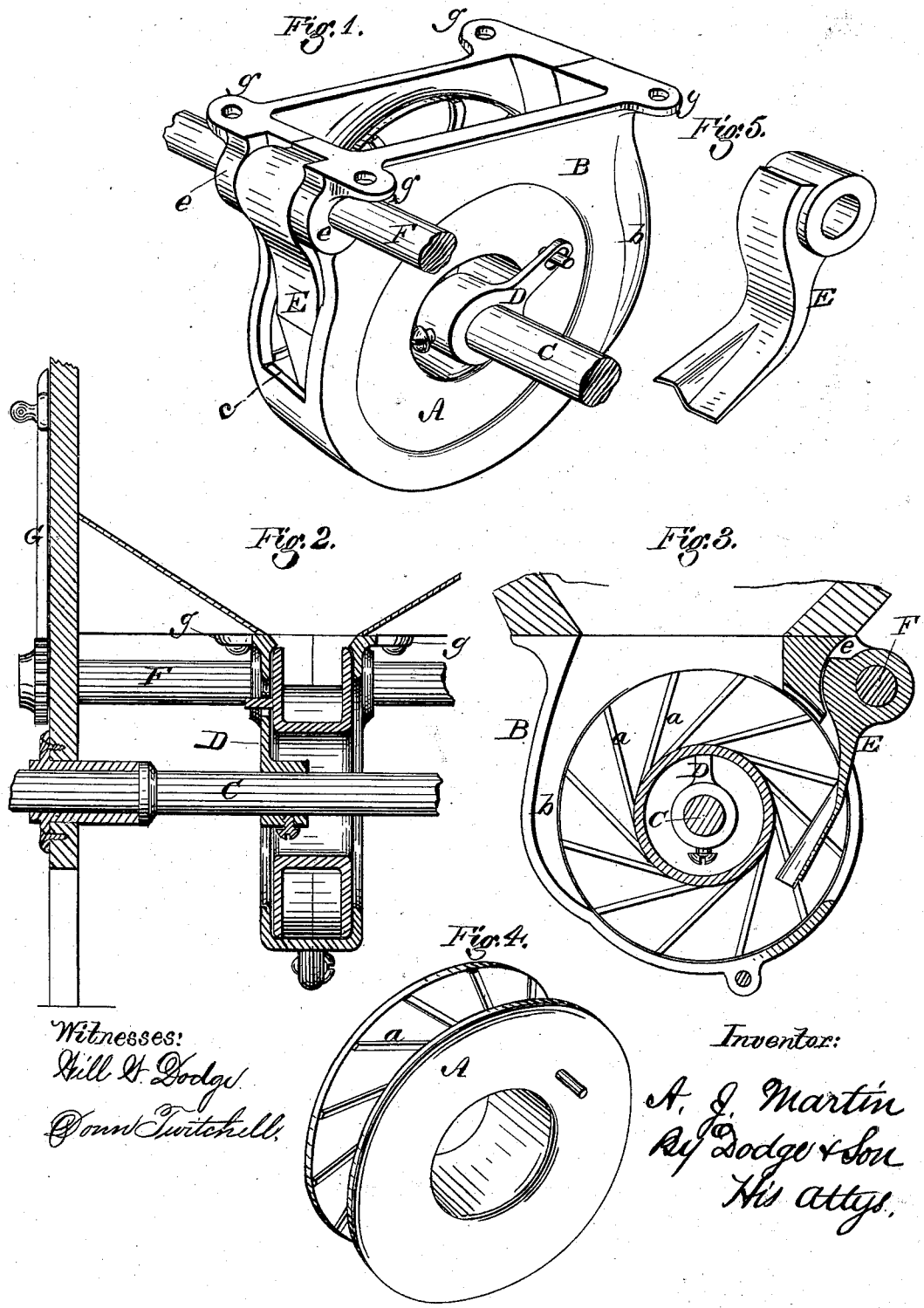

ANDREW J. MARTIN, OF SPRINGFIELD, OHIO, ASSIGNOR TO P. P. MAST & CO., OF SAME PLACE.

IMPROVEMENT IN PERIPHERAL FORCE-FEED FOR GRAIN-DRILLS.

Specification forming part of Letters Patent No. 194,307, dated August 21, 1877; application filed October 1, 1875.

*To all whom it may concern:*

Be it known that I, ANDREW J. MARTIN, of Springfield, in the county of Clarke and State of Ohio, have invented certain Improvements in Peripheral Force-Feed for Grain-Drills, of which the following is a specification:

My invention relates to that class of force-feeds in which the grain is carried in a continuous stream upon or within the periphery of a vertical feed wheel or ring mounted within a case or cup; and the invention consists in the peculiar construction and arrangement of a swinging gate or tongue for controlling the rate of discharge; and in a novel manner of constructing, mounting, and driving the feed-wheel.

Figure 1 is a perspective view of my feeding device complete; Fig. 2, a transverse vertical section through the center of the same in place on the hopper of a machine; Fig. 3, a vertical section of the same from front to rear; Fig. 4, a perspective view of the wheel; Fig. 5, a perspective view of the feed-regulating gate or tongue.

A represents the feed wheel or ring; B, the cup or case in which the wheel is mounted; C, the driving-shaft in the open center of the wheel; D, an arm secured firmly on the shaft and transmitting motion from the shaft to the wheel; E, the feed-regulating gate; F, the rock-shaft, on which the gate is hung; and G, an arm by which the rock-shaft is controlled and operated.

The feed-wheel A is, in the present instance, formed with a circumferential groove or seed-channel of a rectangular form in cross-section, having tangential ribs or teeth $a$ at the sides, to urge the grain outward through the discharge-opening in the case; but, instead of being made in the form shown, the wheel may have a flat peripheral face, or a flat face and one side flange, with or without teeth or ribs, the form of the wheel being immaterial, provided the grain is carried in an unbroken stream in or upon its periphery.

The case or cup B, in which the wheel is mounted, is made of suitable size and form to encircle the wheel, with an enlarged pocket or passage, $b$, at the front to facilitate the flow of the grain backward under the wheel, and a rear opening, $c$, to permit the escape of the grain and admit the end of the regulating gate or tongue.

The case is divided centrally from front to rear into two parts, in order to permit the introduction of the wheel, and is provided with seats or bearings for the edges of the wheel, with ears $e$ to sustain the rock-shaft on which the regulating-gate is mounted, and also with flanges $g$, by which to secure the case to the hopper of the machine, as usual.

The regulating gate or tongue E is made preferably of the form represented in Fig. 5, and arranged as shown in Figs. 1 and 3, with its lower end inserted into the discharge-opening in the rear side of the cup or case, and its upper end secured upon a horizontal rock-shaft, F, mounted in the ears $e$ at the upper rear corner of the case or cup, so that by turning the shaft the lower end of the gate or tongue may be thrown inward toward the center of the feed-wheel into its seed chamber or groove.

When the device is in operation the grain passes down under the front of the wheel and backward until it meets the lower end of the gate which divides the moving stream or current, and directs one portion outward through the discharge-opening, while the other portion is retained within the cup, so as to pass up inside of the gate and continue its course around within the cup or case.

The amount of grain discharged depends upon the point at which the end of the gate stands, the discharge increasing as the gate swings inward, and decreasing as it swings outward.

For the purpose of causing a regular delivery of the grain, especially when the end of the gate is swung inward close to the face of the wheel, the end of the gate is made of a bent form in cross-section, as is clearly shown in Fig. 5, so that even when the gate is swung inward against the face of the wheel there will be a space under one side to permit the passage of grain, and prevent the same from being crushed or broken.

It will be observed that as my gate is arranged its movable end is presented toward the advancing grain, and that as it simply divides the stream of grain and does not tend to detain any portion of the same, the grain does not, and cannot under any circumstances, tend to force the gate out of position. This is an important feature of my device, as it admits of the entire series of gates in the machine being mounted upon and readily controlled by a single shaft, and overcomes all danger of their being pushed out of position, and of the grain being crushed or broken.

I am aware that vertical feed-wheels and radially-swinging gates have been combined heretofore; but in all such cases the grain passed under the rear end of the gate first between the gate and wheel into a space of decreasing width, and the gate served to detain or hold back that portion of the grain which was not to be discharged, the consequence of which was that the grain crowding under the gate pressed outward with great force thereon, causing the gates to move out of position, retarding the movement of the wheel, and necessitating the application of additional power to operate the machine, and causing the breaking and crushing of grain between the wheel and gate.

It is to be distinctly understood that the invention herein described and claimed relates only to those wheels or feeders which carry the grain upon or within the outer exposed edge, or, in other words, upon the periphery, and that it does not relate to or include those wheels which carry the grain on the inside face of a lateral rim or flange.

The wheel may be made with a solid center and mounted directly upon the driving-shaft; or, as shown in the drawing, it may be provided with a large central opening, in order to render it light, and driven by an arm on the main shaft, the cup or case being provided with bearings or seats to receive its outer edges and retain it in position. This manner of mounting and driving the wheel prevents all danger of the wheels being caused to bind by the shaft or cups being thrown out of line.

Having thus described my invention, what I claim is—

1. A force-feed for grain-drills, consisting of a cup or case, a vertical feed-wheel mounted in said cup and feeding at the periphery, and a gate having its forward end arranged to move inward through an opening in the rear side of the cup, so as to divide the moving stream of grain in the cup and direct one portion of the same outward through the opening while the remaining portion is permitted to continue its course within the cup past the gate.

2. The combination, substantially as shown and described, of a feed cup or case, a vertical feed wheel or ring mounted therein and feeding at its periphery, and a movable gate in the rear side of the case arranged to divide the stream of grain passing under the wheel, and to direct more or less of the same outward without retarding or impeding the course of the remaining portion.

3. In combination with a feed cup or case, B, and a vertical wheel, A, mounted therein and feeding on the periphery, a gate or tongue, E, having its rear end pivoted outside of the cup, and its forward end inserted through an opening in the rear side of the case, for the purpose of directing more or less of the moving grain outward from the cup.

4. The combination of the grooved or channeled wheel, having the large central opening, the cup or case B encircling and supporting the wheel, as shown, and the central driving-shaft C, provided with the arm D.

5. The gate E, having its end made of the bent or irregular form in cross-section, substantially as shown.

ANDREW J. MARTIN.

Witnesses:
E. G. DIAL,
J. W. CUMMINGS.